Patented July 28, 1931

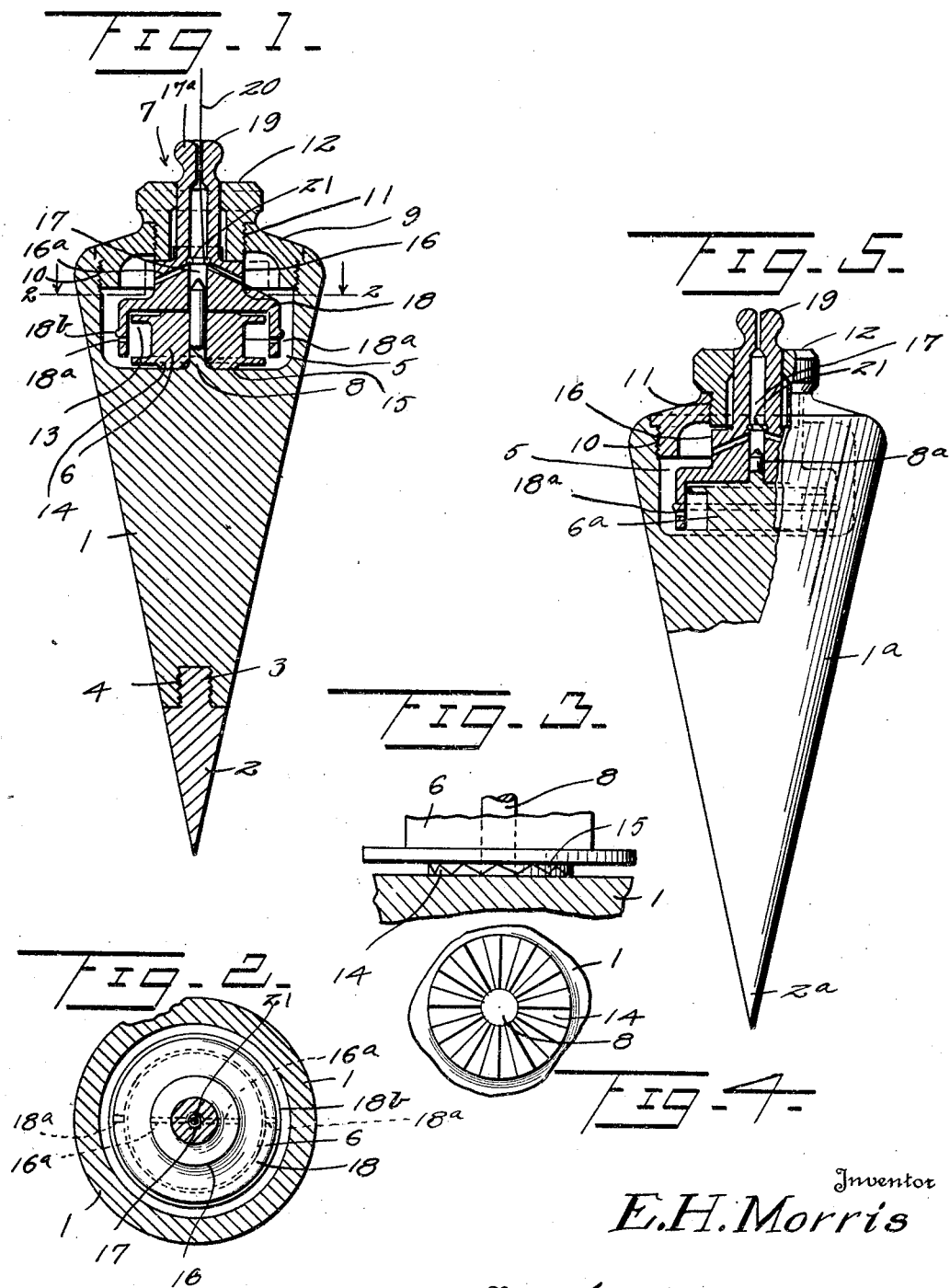

1,816,786

UNITED STATES PATENT OFFICE

EARL H. MORRIS, OF BROOKPORT, ILLINOIS

PLUMMET

Application filed May 14, 1929. Serial No. 362,927.

My invention relates to plummets, and has for one of its objects to provide a device of this character which shall include a body provided in its upper end with a compartment adapted to receive and protect the plumb line.

The invention has for a further object to provide a plummet of the character stated which shall embody a drum or bobbin arranged within the compartment and adapted to have the plumb line wound thereon, together with a member also arranged within the compartment and adapted to insure the uniform winding of the plumb line on the drum or bobbin and adapted to insure the free movement of the plumb line while it is being wound on or unwound from the drum or bobbin.

The invention has for a further object to provide a plummet of the character stated wherein the plumb line winding and guiding member shall be rotatably associated with the bobbin whereby to enable the plumb line to be easily wound upon and unwound from the drum or bobbin, and to permit such member to uniformly wind the plumb line on the drum or bobbin.

The invention has for a further object to provide a plummet of the character stated wherein the drum or bobbin shall be arranged within the compartment of the body in a manner to position its axis in alinement with the vertical center or axis of the plummet, wherein the plumb line winding and guiding member shall be arranged within the compartment for rotation about a vertical axis coincident with the axes of the body and the drum or bobbin, and wherein the member shall be provided with passages and openings arranged and of such a formation as to insure the free passage of the plumb line therethrough and to prevent the abrasion of the plumb line while it is being wound on or unwound from the drum.

The invention has for a further object to provide a plummet of the character stated wherein the drum or bobbin shall be rotatably arranged within the compartment of the body so as to permit the plumb line to reel off from the drum or bobbin and thereby reduce to the minimum the forces tending to twist the plumb line and rotate the body.

The invention has for a further object to provide a plummet of the character stated which shall include means through the medium of which the drum or bobbin and the plumb line winding and guiding member may be secured against rotation with respect to the body.

The invention has for a further object to provide a plummet of the character stated wherein the drum or bobbin and the plumb line winding and guiding member shall be freely removable from the body to permit the easy application of a new plumb line, and wherein said parts shall be capable of being readily reassembled within the body after the application of the new plumb line.

The invention has for a further object to provde a device of the character stated wherein the body and the other parts shall be capable of the finest degree of accurate construction so as to adapt the plummet for use in connection with engineering instruments.

The invention has for a still further object to provide a plummet of the character stated which will permit minute and accurate adjustment of the body and the plumb line with relation to the elevation from which the plumb line hangs when in use, whereby to permit accurate adjustment between the indicating point of the body and the mark to which indication is being made.

These and other objects are attained by the construction shown in the accompanying drawings, wherein for the purpose of illustration are shown perferred embodiments, and wherein:—

Figure 1 is a sectional view taken on a plane extending vertically and centrally through a plummet constructed in accordance with my invention;

Figure 2 is a top plan view of the plummet;

Figure 3 is a detailed view partly in vertical section and partly in elevation illustrating the means for holding the drum or bobbin against rotation with respect to the plummet;

Figure 4 is a top plan view of one member of the means for holding the drum or bobbin against rotation; and Figure 5 is a view partly in vertical section and partly in elevation of a slightly modified form of the plummet.

Referring in detail to the drawings, and particularly to Figures 1 to 4, 1 designates the body and 2 the indicating point of the plummet. The point 2 is by preference detachably connected to the body 1, and these parts are preferably connected by a screw threaded stud 3 formed on the upper end of the point 2 and engaged in a screw threaded socket 4 formed in the lower end of the body. The body 1 is provided in its upper end with a recess or compartment 5 for the reception of the plumb line receiving drum 6 and the plumb line winding and guiding member 7. The compartment 5 is of cylindrical formation, and its axis coincides with the axis of the body 1. A spindle 8, on which the bobbin 6 is rotatably mounted, extends upwardly from the bottom wall of the compartment 5, and is arranged at the axial center of the body 1 and the compartment. A bonnet 9 which is positioned in the open or upper side of the compartment 5 is screw threadedly engaged with the body 1, as at 10, and is provided with a central opening 11 for the reception of the upper portion of the winding and guiding member 7 and for the reception of a clamping screw 12.

The bobbin 6 is horizontally arranged within the compartment 5 and rests upon the bottom wall of the compartment, and is provided at its lateral side or periphery with plumb line retaining flanges 13. Means are provided for normally holding the bobbin 6 against rotation on the spindle 8 and by preference such means comprise teeth 14 and 15, formed on the bottom wall of the compartment 5 and on the lower side of the bobbin 6, respectively. The teeth 14 and 15 are preferably of V-form, and those on the bobbin 6 engage with those on the bottom wall of the compartment 5 to hold the bobbin against rotation, as clearly shown in Figure 3.

The winding and guiding member 7 comprises a cylindrical body portion 16 which rests upon the bobbin 6 and is provided at its vertical center with a passage 17, for the reception of the upper end of the spindle 8. An annular flange 18 extends downwardly from the body portion 16 in surrounding relation to the bobbin 6, and is provided with radial openings 18a. A stem 19 extends upwardly from the body portion 16 and is arranged at the center thereof. The stem 19 is provided with a central passage which constitutes a continuation of the passage 17 of the body portion 16 and which has the upper end portion thereof of reduced diameter, as shown at 17a. The clamping screw 12 is hollow for the reception of the stem 19, has threaded engagement with the wall of the opening 11 in the bonnet and contacts with the upper side of the body portion 16.

The plumb line 20 is wound upon the bobbin 6 and extends from the bobbin through the winding and guiding member 7. The plumb line 20 extends through one of the openings 18a in the flange 18, through one of a pair of inwardly inclined openings 16a formed in the body portion 16 and communicating with the passage 17 above the spindle 8, and then on through passage 17. To insure the free passage of the plumb line 20 through the winding and guiding member 7, and to prevent the abrasion of the plumb line during its passage through said member, the walls of the openings 18a are rounded, the flange 18 is provided immediately above the openings with projections 18b and the upper corner of the flange is rounded, and a ring or eye 21 is arranged in the passage 17 immediately above the inner ends of the openings 16a, the plumb line contacting with this part, as clearly shown in Figure 1.

If desired, the body and indicating point of the plummet may be formed integrally, as shown in Figure 5, wherein said parts are designated 1a and 2a, respectively. The bobbin 6 may also be formed integrally with the plummet as shown in this figure, and when this is done the bobbin, which is here designated 6a, is provided at the axial center of the body 1a with a spindle 8a for the winding and guiding member. The remaining parts of the plummet shown in this figure are similar to the corresponding parts of the plummet shown in Figures 1 to 4 and designated by corresponding reference characters.

From the foregoing description, taken in connection with the accompanying drawings, it should be apparent that the plumb line 20 may be easily and quickly wound on or unwound from the bobbin 6, and that the plumb line is guided in its movements on or off of the bobbin by the member 7 which, when the screw 12 is turned upwardly, may be moved upwardly with respect to the bobbin and then moved downwardly during the winding of the plumb line in order to uniformly distribute the line over the bobbin so as to prevent it from becoming entangled and thus insure its free unwinding from the bobbin. The reduced portion 17a of the passage 17 in the winding and guiding member 7, is arranged in alinement with the axis of the plummet so as to insure the suspension of the plummet with its axis in a vertical position. When it is desired to permit the bobbin 6 to rotate with respect to the plummet, the clamping screw 12 is turned slightly upward to free the teeth 14 and 15 from interlocking engagement, and when the bobbin is free to rotate the plumb line will reel therefrom. After the plumb line 20 has unwound from the bobbin 6 sufficiently to support the plummet at the desired elevation, the clamping screw 12 is turned downwardly to cause the teeth 14 and 15 to interlock and secure the plummet at the desired elevation. When it is desired to re-wind the plumb line 20 upon the bobbin 6, the clamping screw 12 is turned upwardly to release the winding and guiding member 7 sufficiently to permit it to be turned without releasing the teeth 14 and 15, and thereafter, said member is turned while the plummet is held against rotation, the teeth holding the bobbin against turning movement during the winding thereon of the plumb line. After the plumb line 20 has been wound upon the bobbin 6, it is held against unwinding by locking the member 7 against rotation with respect to the bobbin through the medium of the clamping screw 12. When the plumb line 20 is fully wound upon the bobbin 6, it will be completely housed and protected.

After the removal of the bonnet 9 and clamping screw 12, the winding and guiding member 7 and the bobbin 6 may be removed from the compartment 5, and with these parts removed from the compartment a new plumb line may be readily connected to the bobbin and threaded through the winding and guiding member. In the form of the plummet shown in Figure 5 the new line may be applied to the bobbin 6a and threaded through the winding and guiding member 7 after the removal of said member, the bonnet 9 and the clamping screw 12. All parts of the plummet are symmetrical with respect to their vertical axes, and the axes of all parts coincide so as to adapt the plummet for use in connection with engineering instruments.

While I have described the principle of the invention and illustrated two embodiments thereof, I wish it understood that the structures above shown are merely illustrative, and that such changes may be made therein when desired as fall within the scope of the invention as claimed.

I claim:—

1. A plummet comprising a body provided in its upper end with a compartment having its upper side open, a member partly closing said side of the compartment, a spindle extending upwardly from the bottom wall of the compartment at the axis of the body, a bobbin rotatably mounted on the spindle, elements carried by the body and bobbin and cooperating when in engagement to hold the bobbin against rotation, a plumb line wound on the bobbin, means for winding the plumb line on the bobbin and for guiding the plumb line while being wound on or unwound from the bobbin, and a means carried by said member and cooperating with the said first means to releasably maintain said elements in engagement.

2. A plummet comprising a body provided in its upper end with a compartment having its upper side open, a member partly closing said side of the compartment, a hollow clamping screw carried by said member, a spindle extending upwardly from the bottom wall of the compartment, a bobbin rotatably mounted on the spindle, a plumb line wound on the bobbin, and a plumb line guiding and winding member having a body portion arranged between the bobbin and clamping screw and journaled on the spindle, said winding and guiding member having a depending annular flange surrounding the bobbin and provided with a radial opening for the line, said winding and guiding member being provided with a stem extending upwardly through the clamping screw, and said stem having a vertical passage and said body portion having a laterally inclined opening for the plumb line.

3. A plummet comprising a body, a bobbin carried by the body, a plumb line wound on the bobbin, and means for winding and guiding the plumb line and rotatably mounted on the body and provided with a flange surrounding the bobbin and having an opening for the passage of the plumb line.

4. A plummet comprising a body, a bobbin carried by the body, a plumb line wound on the bobbin, means for winding and guiding the plumb line and rotatably mounted on the body and provided with a flange surrounding the bobbin and having an opening for the passage of the plumb line, and means by which said winding and guiding means may be held against rotation.

5. A plummet comprising a body provided with a compartment, a bobbin arranged within the compartment, a plumb line wound on the bobbin, means for winding and guiding the plumb line and having a portion arranged between the bobbin and one wall of the compartment, and a clamping member carried by said wall for movement into and out of contact with said portion of said winding and guiding means.

6. A plummet comprising a body provided in its upper end with a compartment having its upper wall provided with an opening, a bobbin arranged within the compartment with its axis vertically disposed, a plumb line wound on the bobbin, means for winding and guiding the plumb line and having a body portion arranged between said opening and bobbin, and a clamping member adjustably engaged with said wall and extending through the opening therein for contact with said portion of the winding and guiding means.

7. A plummet comprising a bobbin carried by the body, a plumb line wound on the bobbin, means for winding and guiding the plumb line and rotatably mounted on the body, said means embodying a stem axially alined with the bobbin and provided with an axial bore, said member having a flange located radially opposite the bobbin and provided with an opening, the plumb line passing through said bore and opening, and means for releasably holding said winding and guiding means against rotation with respect to the body.

8. A plummet comprising a body, a bobbin mounted on the body, a plumb line wound on the bobbin, means connecting the bobbin to the body to permit the former to be held against rotation with respect to the latter, and means adapted to wind the plumb line on the bobbin while the latter is held against rotation.

9. A plummet comprising a body, a bobbin, a plumb line on the bobbin, and means connecting the bobbin to the body to permit the former to be held against rotation with respect to the latter during the winding of the plumb line on the bobbin, said means permitting the bobbin to be released from the body to turn with respect to the body during the unwinding of the plumb line therefrom.

10. A plummet comprising a body, a bobbin carried by the body, a plumb line wound on the bobbin, means for winding and guiding the plumb line, a member carried by the body in spaced relation to the bobbin, and a clamping member carried by said first member for movement into and out of contact with said winding and guiding means.

11. A plummet comprising a body, a bobbin carried by the body, a plumb line wound on the bobbin, means for winding and guiding the plumb line, a member carried by the body in spaced relation to the bobbin, said means having a portion thereof arranged between the bobbin and said member, and a clamping member carried by said first member for movement into and out of contact with said portion of said means.

In testimony whereof I hereunto affix my signature.

EARL H. MORRIS.